A. SPIELMAN.
BALL BEARING.
APPLICATION FILED SEPT. 24, 1915.

1,261,172.  Patented Apr. 2, 1918.

WITNESSES:
Helen M. Byrne
Winfield J. Hacker

INVENTOR.
Adolph Spielman.
BY William J. Jackson
ATTORNEY.

UNITED STATES PATENT OFFICE.

ADOLPH SPIELMAN, OF PHILADELPHIA, PENNSYLVANIA, ASSIGNOR, BY MESNE ASSIGNMENTS, TO LOGAN TRUST COMPANY OF PHILADELPHIA, TRUSTEE.

BALL-BEARING.

1,261,172.

Specification of Letters Patent.

Patented Apr. 2, 1918.

Original application filed August 8, 1912, Serial No. 714,136. Divided and this application filed September 24, 1915. Serial No. 52,332.

*To all whom it may concern:*

Be it known that I, ADOLPH SPIELMAN, a citizen of the United States, residing at Philadelphia, in the county of Philadelphia and State of Pennsylvania, have invented certain new and useful Improvements in Ball-Bearings, of which the following is a specification, the same being a division of my application for Letters Patent Serial No. 714,136, filed August 8, 1912.

The principal object of the present invention is to provide a new and novel method of manufacturing and assembling a ball bearing the balls of which are of the mutilated type and the cage of which is shaped and proportioned to accept and space said mutilated balls whereby the balls as well as the cage may be introduced to proper place with the rings in concentric position.

With this and other objects in view, the invention consists of the improvements hereinafter described and finally claimed.

Figure 1:
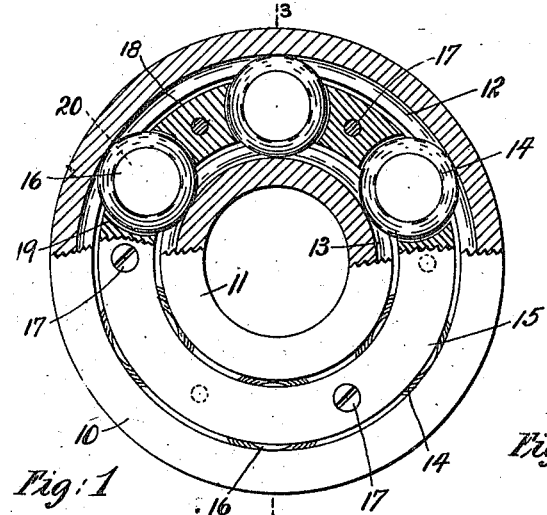
Figures 2, 3:
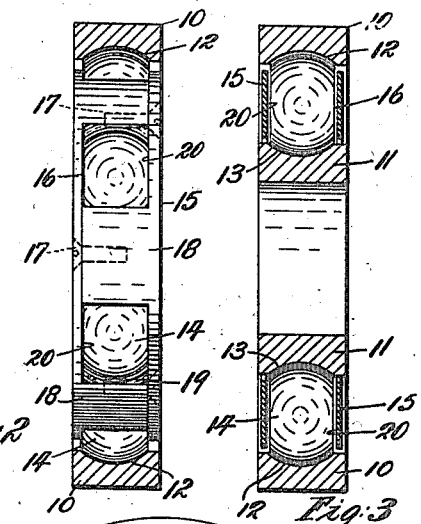
Figure 6:
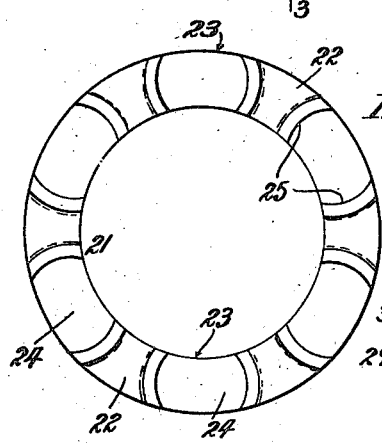
Figure 11:
Figure 4:
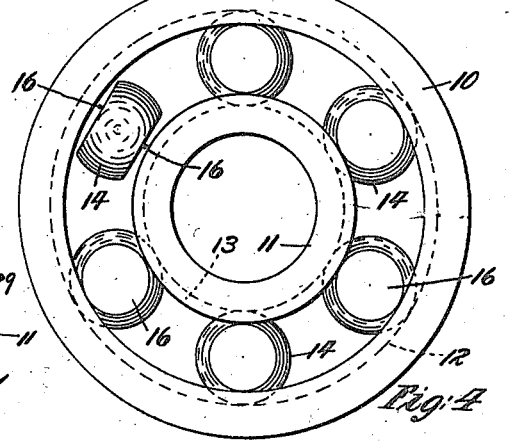
Figure 7:
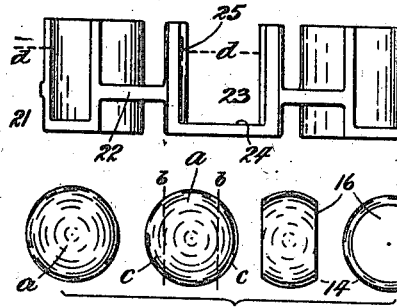
Figure 5:
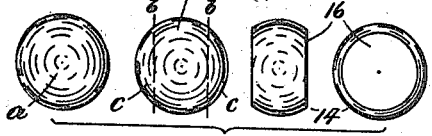
Figures 8, 9, 10:
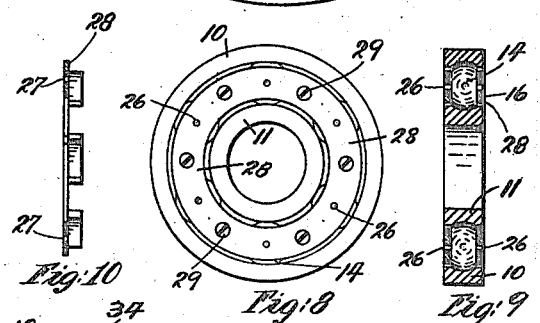
Figures 12, 13, 14:
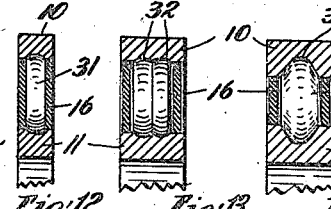

The nature, characteristic features and scope of the invention will be more fully understood from the following description taken in connection with the accompanying drawings forming part hereof and in which, Figure 1, is a view in side elevation, partly sectioned, of a complete bearing embodying the invention, Fig. 2, is a cross sectional view of the bearing, the cage parts being shown intact, Fig. 3, is a view in cross section, taken upon the line 3—3 of Fig. 1, Fig. 4, is a view in side elevation of the bearing rings shown in Fig. 1, and illustrating the manner of assembling the spheroids therebetween, Fig. 5, illustrates the preferred manner of forming the spheriods embodying the invention, Figs. 6, and 7, are respectively views in plan and side elevation of a form of cage somewhat different from that shown in Figs. 1, 2, and 3, Figs. 8, and 9, are respectively views in side elevation and cross section of a slightly modified form of bearing, Fig. 10, is a detail view, in cross section, of one of the cage parts shown in Figs. 8, and 9, Fig. 11, is a fragmentary view, in section, illustrating still another form of bearing, and Figs. 12, 13, and 14, are similar views illustrating still further forms of bearings.

The bearing illustrated in the drawing and hereinafter termed a spheroid bearing, comprises two concentric rings 10, and 11, preferably of hardened steel, said rings having an annular space therebetween. The outer ring 10, has an annular groove 12, in its inner periphery and the inner ring 11, has a confronting annular groove 13, in its outer periphery, which grooves form the races for an interposed series of spheroids 14, a cage 15, of suitable soft metal being arranged in the annular space between said bearing rings. The spheroids 14, are arranged to travel within the races upon their spherical faces, the flat or relatively flat faces of said spheroids being arranged in parallelism with the flat faces of the rings 10, and 11. The spheroids 14, are preferably formed by taking hardened steel balls $a$, see Fig. 5, and cutting therefrom as indicated by the dotted lines $b$, spherical segments $c$. The purpose of using spheroids is to provide a narrow bearing particularly adapted for use in restricted space. It often happens in restricted space where ball-bearings are used, that the balls used are not quite as large as are required to carry a calculated load. By using spheroids comparatively narrow bearing rings 10, and 11, and narrow cages may be utilized. In other words, those parts of the cage 15, and rings 10, and 11, which ordinarily cover the spherical segments $c$, just referred to may be dispensed with. Thus, a relatively wide ball-bearing in a relatively wide space and of a given load carrying capacity may have substituted therefor, by the present invention a comparatively narrow spheroid bearing of exactly the same load carrying capacity in a much narrower space.

The manner of inserting the spheroids 14, within the races of the concentric rings 10, and 11, is illustrated in Fig. 4. In this connection, it is to be observed that the said rings 10, and 11, are first arranged in concentric position, the flat faces 16, of the spheroids 14, are then taken between the index finger and thumb of the operator and the spheriods in this position inserted between the bearing rings. Then by a twist of the wrist of the operator the spherical faces of the spheroids are caused to seat themselves within the races of the rings, the flat faces 16, then assuming a position parallel with the flat faces of the bearing rings. With the spheroids in this position, a cage for spacing the spheroids of the bearing is fitted to place, the outer faces of which are preferably in the same relative plane as the outer faces of the rings 10, and 11. The cage may be of the construction disclosed in Figs. 1, 2, and 3; or that shown in Figs. 6, and 7; or that shown in Figs. 8, 9, and 10; or of any other preferred construction.

As shown in Figs. 1, 2, and 3, the cage is two-part and is of the type usually termed a divider ring, the parts being rigidly connected together by means of screws 17, or by rivets or other suitable mediums. As shown in said figures, the divider rings are provided alternately upon their inner faces with inwardly extending projections 18, which abut against the opposite inner faces of said divider rings. These projections 18, are spaced apart as shown in Fig. 1, and provided with spherical cavities or sockets 19, to accommodate the spherical faces of the spheroids. The parts 20, of the divider rings between the projections 18, are flat as shown in Fig. 2, in order to accommodate the flat faces 16, of the spheroids. In Figs. 6, and 7, the cage 21, is shown as comprising a one-piece construction and consists of an annular rib 22, provided at intervals therearound with generally U-shaped spheroid receiving sockets 23. The sockets 23, are each provided with a flat part 24, to accommodate one of the flat faces 16, of the spheroids 14, and with concaved parts 25, to accommodate the spherical faces of the spheroids. These parts 25, are of such dimension that when the spheroids are in proper position within the cage the free ends of the parts 25, may be turned over at the points designated by the dotted lines $d$, to retain the spheroids in place. As shown in Figs. 8, and 9, the flat faces of the spheroids are provided with lateral pins 26. These pins 26, are adapted to be received by the apertures 27, in the opposite sides of the divider ring 28, screws 29, rivets or the like being present for rigidly connecting the two-part divider ring to place. As shown in Fig. 11, the cage 29, is secured to place by means of screws 30, or other suitable means, the screws passing through the spheroids and around which the spheroids are capable of revolving. As shown in Fig. 12, the spheroid 31, is of generally disk-like configuration; in Fig. 13, the spheroid is shown as comprising a relatively flat sided member having generally convexed crown portions 32; and in Fig. 14, the spheroid 33, has generally tapered convexed bearing face 34.

By this invention comparatively narrow cages and consequently comparatively narrow bearing rings may be employed without decreasing the load carrying capacity of a spheroid bearing over an ordinary ball-bearing having races of the same size. It may be remarked also that the type of bearing just described provides an excellent end thrust bearing, which obviously is advantageous. This is true because each spheroid can only revolve around its single axis and the flat faces of the spheroids receive end thrusts without twisting of the spheroids within the races, consequently little or no friction is present. In an ordinary ball-bearing, however, end thrusts tend to cause the balls to twist within the races, because the balls are free to rotate around several axes, and such twisting of the balls serves to cause friction. It is to be further noted that the spheroid race may in the above described bearing be of the same dimension as an ordinary ball-bearing and accommodate spheroids of the same diameter as balls to run therein considered concentrically of the bearing, but yet save in width of the bearing much valuable space.

What I claim is:

The method of manufacturing and assembling a ball bearing, the balls of which are of the mutilated type which consists in forming inner and outer rings having opposing grooves forming a raceway, said rings being separated by a distance equal to the width or distance between the flat sides of a mutilated ball when the rings are concentric, introducing through said space with the rings in concentric position a continuous series of mutilated balls in sidewise position and then turning them over upon themselves so that they distribute themselves in self-sustaining position within the raceway with their circumferences tracking in the raceway and securing them so that they will be maintained in this position.

In testimony whereof, I have hereunto signed my name.

ADOLPH SPIELMAN.

In the presence of—
  WILLIAM J. JACKSON,
  HELEN M. BYRNE.